A. H. HANDLAN, Jr.
DOUBLE WALLED BARREL.
APPLICATION FILED JULY 22, 1908.
926,324.
Patented June 29, 1909
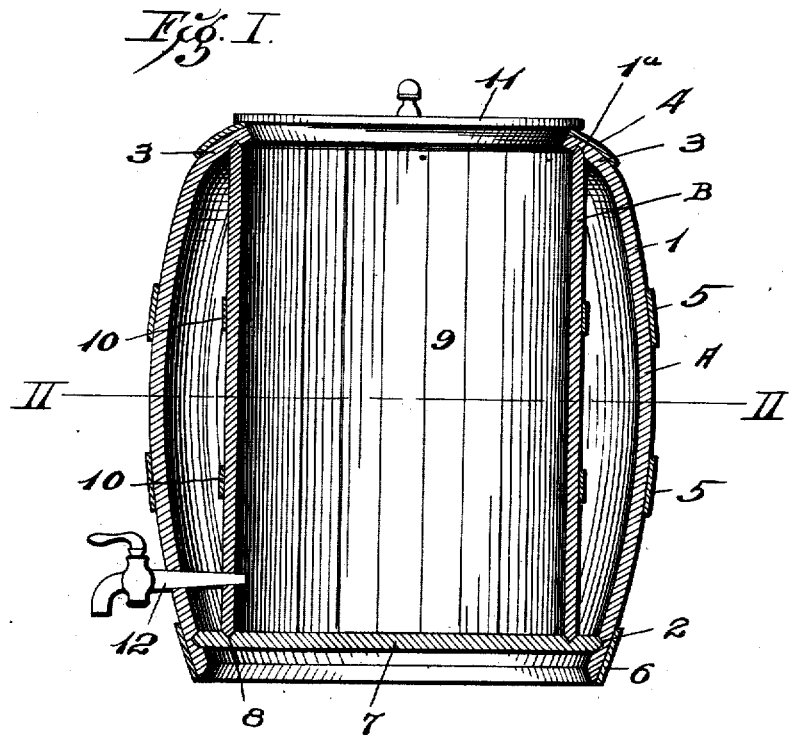
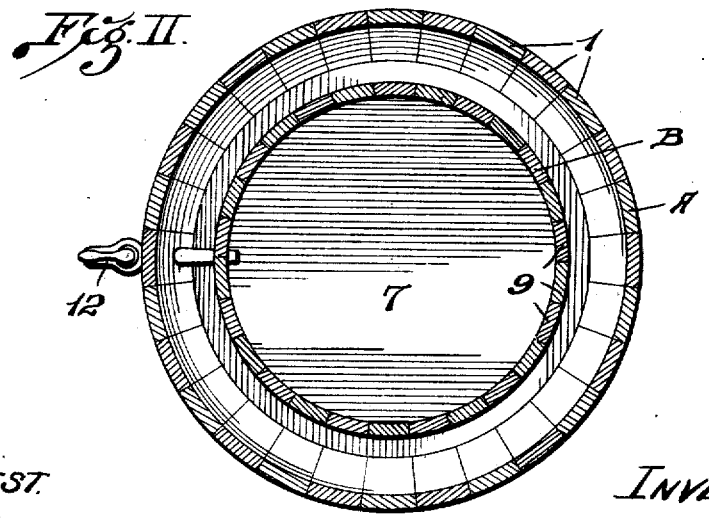
ATTEST.
E. W. Harrington.
Blanche Hogan
INVENTOR.
A. H. Handlan, Jr.
BY Geo. H. Wright ATTY.

UNITED STATES PATENT OFFICE.

ALEXANDER H. HANDLAN, JR., OF ST. LOUIS, MISSOURI.

DOUBLE-WALLED BARREL.

No. 926,324.      Specification of Letters Patent.      Patented June 29, 1909.

Application filed July 22, 1908. Serial No. 444,727.

*To all whom it may concern:*

Be it known that I, ALEXANDER H. HANDLAN, Jr., a citizen of the United States of America, residing at the city of St. Louis, in the State of Missouri, have invented certain new and useful Improvements in Double-Walled Barrels, of which the following is a full, clear, and exact description, reference being had to the accompanying drawings, forming part of this specification.

My invention relates to a vessel more particularly intended for use as a water cooler of simple and efficient construction, and in which there is a dead air insulation space between the inner and outer members of the vessel.

Figure I is a vertical section taken centrally through my double-walled barrel. Fig. II is a horizontal section taken on line II—II, Fig. I.

In the accompanying drawings: A designates the shell of my barrel which is composed of bilged staves 1 and a bottom head 7. The bottom head is seated in crozes 2 in the inner faces of the shell staves. The upper ends of the shell staves are curved inwardly, as seen at 3, so that they overhang the bottom head and they are provided at their upper ends and in their curved portions with undercut grooves 1ª. The shell staves are held assembled by the top hoop 4 correspondingly curved and applied to the curved upper portions of the staves, bilge hoops 5 and a bottom hoop 6, the latter of which surrounds the barrel opposite the bottom head 7.

B designates the inner wall of the barrel which is spaced apart from the outer wall A and is composed of staves 9 preferably made straight from end to end and held assembled by hoops 10. The upper ends of the inner wall staves 9 are seated in the grooves 1ª in the curved upper ends of the shell staves 1 and the lower ends of said inner wall staves are seated in grooves 8 in the upper face of the bottom head 7 and located beneath the grooves 1ª. It will be seen that when the parts of the inner wall and shell of my barrel are assembled and the hoops included therein are tightly fitted around the staves of said shell and wall, all of the parts of the cooler are firmly and securely held and that, due to the separation of the inner wall from the shell, a dead air space is provided between these members to furnish insulation in the barrel.

11 is a cover that is movably fitted to the upper end of the shell of the barrel and which is preferably tapered to fit a corresponding taper at the upper end of the shell in order that when the cover is seated in the barrel, a substantially air-tight joint will be provided between it and the shell. A suitable faucet 12 is mounted in the shell and inner wall to provide for the withdrawal of water from the barrel.

I claim:—

1. A double walled barrel comprising a shell composed of staves having inwardly curved overhanging upper ends provided with undercut grooves and lower ends provided with crozes, a bottom head fitting in the crozes of said shell staves and provided with grooves at its upper face, an inner wall comprising staves having their lower ends seated in the grooves in said bottom head and their upper ends seated in the undercut grooves in the inwardly curved overhanging upper ends of the shell staves, and hoops surrounding said shell staves; substantially as set forth.

2. A double walled barrel comprising a shell composed of staves having inwardly curved overhanging upper ends provided with undercut grooves and lower ends provided with crozes, a bottom head fitting in the crozes of said shell staves and provided with grooves at its upper face, an inner wall comprising staves having their lower ends seated in the grooves in said bottom head and their upper ends seated in the undercut grooves in the inwardly curved overhanging upper ends of the shell staves, and hoops surrounding said shell staves, one of the hoops being fitted to the overhanging upper ends of the staves; substantially as set forth.

ALEXANDER H. HANDLAN, JR.

In the presence of—
H. G. COOK,
BLANCHE HOGAN.